United States Patent [19]

Larseneur

[11] Patent Number: 5,244,184
[45] Date of Patent: Sep. 14, 1993

[54] FLUID FLOW CONTROL DEVICE HAVING AN OBTURATING MEMBRANE DEFORMABLE IN THE DIRECTION OF FLUID FLOW

[75] Inventor: Patrick Larseneur, Versailles, France

[73] Assignee: Valeo Thermique Habitacle, Le Mesnil-Saint-Denis, France

[21] Appl. No.: 836,059

[22] Filed: Feb. 12, 1992

[30] Foreign Application Priority Data

Feb. 21, 1991 [FR] France .................................. 91 02100

[51] Int. Cl.⁵ ........................ F16K 7/12; F16K 31/46; B60H 1/00
[52] U.S. Cl. .................................. 251/294; 251/331; 454/73; 454/333
[58] Field of Search .................. 251/331, 294; 454/73, 454/333

[56] References Cited

U.S. PATENT DOCUMENTS

| | | |
|---|---|---|
| 1,793,396 | 2/1931 | Haentjens . |
| 2,934,902 | 5/1960 | Anderson ........................ 251/331 X |
| 3,138,304 | 6/1964 | Raehs ................................ 251/331 X |
| 3,661,468 | 5/1972 | Schwartzman ................. 251/331 X |

FOREIGN PATENT DOCUMENTS 0229545  7/1987  European Pat. Off. .
2600122 12/1987  France .

*Primary Examiner*—Arnold Rosenthal
*Attorney, Agent, or Firm*—Morgan & Finnegan

[57] ABSTRACT

A fluid flow control device comprises a duct having an inlet aperture and an obturating member, which is mounted in the duct and movable by an actuating member between a first position in which it closes the duct and a second position in which the duct is fully open. The control device comprises a flexible membrane which is fixed around its periphery to the annular wall of the duct. The membrane is arranged to adopt a closing position in which its central region closes off the inlet aperture within the duct, and an open position in which its central region is spaced away from the inlet opening so that the fluid can pass through the latter and through further apertures formed in an annular region of the membrane which join its central region to its periphery.

4 Claims, 1 Drawing Sheet

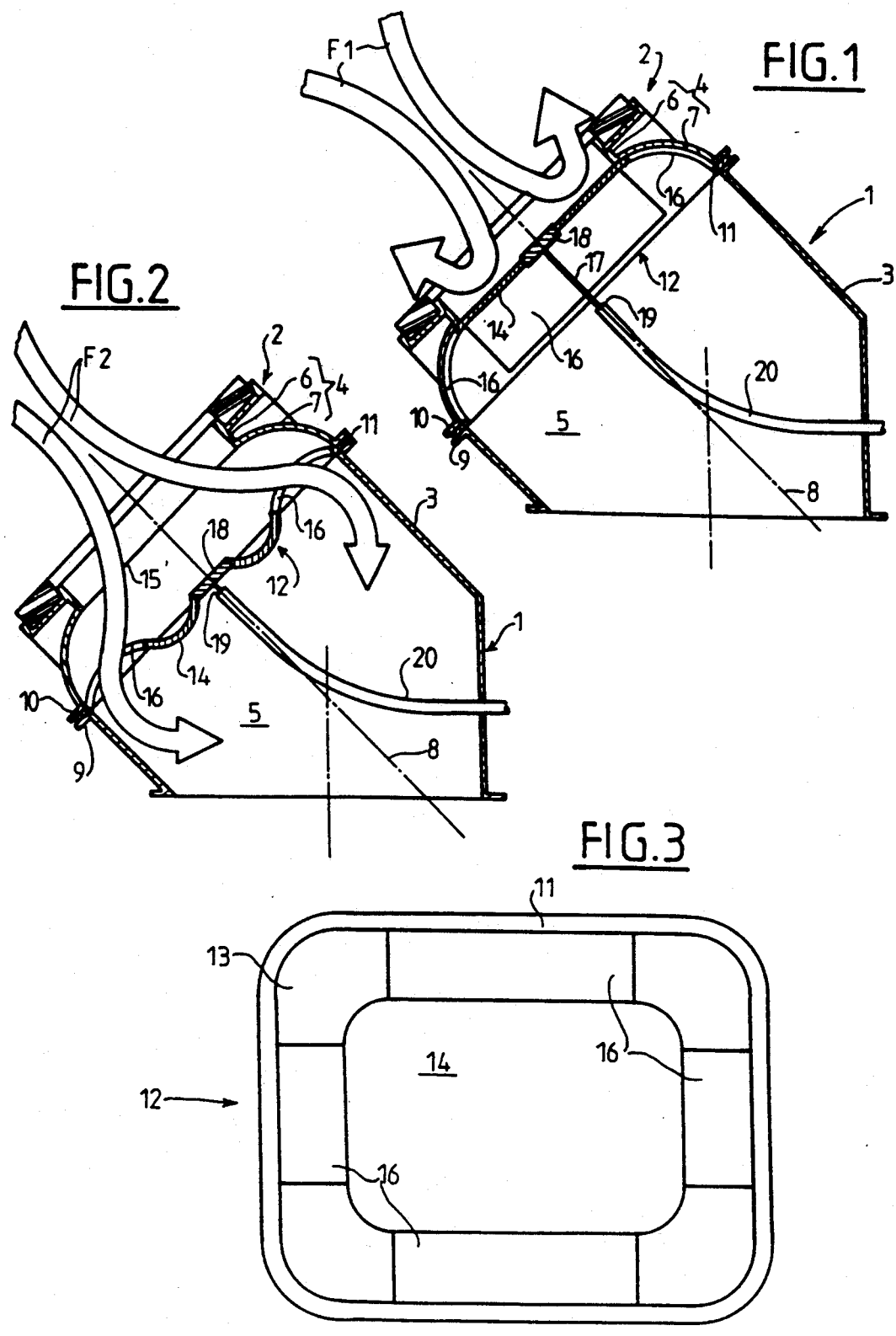

FLUID FLOW CONTROL DEVICE HAVING AN OBTURATING MEMBRANE DEFORMABLE IN THE DIRECTION OF FLUID FLOW

FIELD OF THE INVENTION

This invention relates to a fluid flow control device for interrupting and controlling the flow of a fluid, for example an airstream for introduction into the cabin of a motor vehicle.

BACKGROUND OF THE INVENTION

Heating and ventilating, or air conditioning, installations for the cabin of a motor vehicle usually include a control device for controlling airstreams, comprising a movable obturating member in the form of a pivoting or sliding valve member arranged in a duct for the corresponding airstream. The pivoting or sliding movement of these valve members, and the presence of actuating means for the latter, involves quite a large component size in the direction of the airstream and/or transversely to the latter, which makes such devices difficult to fit in the restricted space which is available below the fascia of the vehicle.

DISCUSSION OF THE INVENTION

An object of the present invention is to overcome this disadvantage, and to provide a smaller control device.

According to the invention, a fluid flow control device, comprising a movable obturating member disposed in a duct for flow of the said fluid therein, the obturating member being adapted to assume a first position in which it obturates the said duct and a second position in which it allows the fluid to flow, is characterised in that the obturating member is a flexible membrane which is secured by its periphery to the wall of the duct, and which is arranged to be moved by an actuating member acting in the direction of the fluid flow into the said first position in which it engages against a seating defining a duct aperture for passage of the fluid into the said duct, with the said duct aperture then being obturated by a central region of the membrane, whereas in the said second position the membrane is spaced away from the said seating and the fluid passes through further apertures formed in an intermediate region of the membrane surrounding the said central region of the latter.

In a preferred form of control device according to the invention, the edge of the said duct aperture is offset, in the direction of flow of the fluid, from the zone in which the membrane is secured to the duct wall the said edge of the duct opening being joined to the said zone by a wall portion having a rounded, concave profile defining the said seating.

Preferably, the said first position corresponds to a stable state of the membrane in which its central region is substantially flat. Preferably also, the membrane is corrugated in its second position.

Preferably, the actuating member comprises a cable slidingly mounted in a sheath, one end of which is fixed, with a portion of the cable projecting beyond the said end of the sheath in the direction of flow of the fluid, the said cable portion being attached to the central region of the membrane.

Further features and advantages of the invention will appear more clearly from the detailed description of a preferred embodiment given below with reference to the accompanying drawings.

BRIEF DESCRIPTION OF THE DRAWINGS

FIGS. 1 and 2 are views in cross section showing part of a heating or air conditioning installation for a motor vehicle having a control device in accordance with the invention, with the membrane in its closed position and its open position respectively; and FIG. 3 is a plan view of the membrane in the open position.

DESCRIPTION OF A PREFERRED EMBODIMENT OF THE INVENTION

FIGS. 1 and 2 show two hollow members 1 and 2, made of a plastics material, which are part of a casing of the heating or air conditioning installation. These two hollow members define annular walls 3 and 4 which delimit an air duct 5 in two consecutive regions of the latter. The wall 3 of the casing member 1 has, adjacent to the second hollow member 2, a constant transverse cross section in the form of a rectangle with rounded corners. The wall 4 of the hollow member 2 also has, in a region 6 which is spaced away from the wall 3 of the first member 1, a constant transverse cross section in the form of a rectangle. This rectangle has rounded corners, but its sides are shorter sides than those of the rectangle defined by the wall 3. Extending from the latter to the region 6 is a further region 7 of the wall 4, having a progressively decreasing transverse cross section.

Lengthwise of the duct 5 as shown in FIG. 2, this region 7 has a rounded profile which is concave towards the interior of the duct, and which is substantially in the form of a quadrant of a circle. The tangent to this quadrant is oriented substantially parallel to the longitudinal axis 8 of the duct at its end adjacent to the wall 3, and is substantially perpendicular to this axis at the junction of the regions 6 and 7.

The mutually adjacent ends of the wall 3 and region 7 of the wall 4 are joined respectively to two annular flanges 9 and 10 which are part of the hollow members 1 and 2. These flanges 9 and 10 extend radially outwardly from the walls 3 and 4. A marginal or peripheral zone 11 of a flexible membrane 12, which is for example made of an elastomeric material, is gripped between the flanges 9 and 10.

The membrane 12 has an intermediate annular region 13 and a central region 14 which is joined by the intermediate region 13 to the peripheral portion 11. As shown in FIG. 3, the profile of the member 12 is such that this intermediate annular region 13 can lie against the inner face of the curved region 7 of the wall 4 as far as the junction of the regions 6 and 7, with the central region 14 of the membrane extending, in a plane that is perpendicular to the axis 8, across a duct or air inlet aperture 15 which is defined by the junction between the wall regions 6 and 7.

This position of the membrane, which is shown in FIG. 1, preferably corresponds to a stable state of the membrane which may be obtained during the manufacture of the membrane by moulding. Apertures 16 are formed through the annular intermediate region 13 of the membrane, and in the position seen in FIG. 1 they do not reach as far as the edge of the duct aperture 15.

An actuating member in the form of a drive cable 17 is secured by its end to a junction piece 18 which is fixed to the membrane 12 at the centre of the latter. The cable 17 projects beyond the end 19 of a sheath 20 (the end 19 being fixed and lying on the axis 8), and is able to slide inside the sheath 20 when actuated by a control mechanism not shown. It can thus move the junction piece 18 from the position which it occupies in FIG. 1 to that shown in FIG. 2, in which the junction piece 18 lies substantially in the plane of the peripheral zone 11. The membrane 12 thus assumes a corrugated shape extending substantially radially between the junction piece 18 and the marginal portion 11, with its intermediate region 13, including the membrane apertures 16, then being spaced away from the curved wall region 7.

In the position shown in FIG. 1, the unperforated central region 14 of the membrane is in contact with the edge of the inlet aperture 15 over the whole of the perimeter of the latter, and therefore closes off the duct 5. The arrows F1 show the airstream, which is unable to pass from the duct portion defined by the wall 6 into that defined by the walls 7 and 3, but is deflected in another direction. In the position seen in FIG. 2 on the other hand, the inlet aperture 15 is opened, and the airstream is enabled to pass, as indicated by the arrows F2, through the aperture 15 from the duct portion defined by the wall 6 into that defined by the wall 7, and thence through the apertures 16 in the membrane into the interior of the first hollow member 1 defined by the wall 3. The flow cross section which is afforded by the membrane apertures 16 should be adapted to the maximum air flow required in the duct 5.

The control mechanism for the cable 17 may of course be arranged to put the cable, and therefore the membrane 12, in any intermediate position between those shown in FIGS. 1 and 2, in such a way that the air flow in the duct can be progressively adjusted.

What is claimed is:

1. A fluid control device for a climate control system in a motor vehicle comprising:
   a climate control duct having a duct wall defining a passage for flow of a climate control fluid through the duct;
   a seating in the duct defining a duct aperture for introduction of the climate control fluid into the duct;
   a flexible, deformable membrane member having a peripheral portion secured to the duct wall, a central portion selectively engageable with said duct seating, and an intermediate portion surrounding said central portion and connecting said central portion to said peripheral portion, said intermediate portion including at least one fluid flow aperture; and
   an actuating member fixedly attached to said central portion of said membrane and selectively operable to: (a) force said membrane central portion against said duct seating to close said duct and prevent the flow of climate control fluid therethrough in a first position of the membrane; (b) separate said membrane central portion away from said duct seating to permit a maximum flow of climate control fluid through said duct aperture in a second position of the membrane; and (c) separate said membrane central portion a desired distance from said duct seating to permit a desired, less than maximum, flow of climate control fluid through said duct in a third position of the membrane, wherein said duct wall includes a wall portion having a rounded, concave profile defining said seating, and a fastening zone in which the membrane is fixed to the duct wall, the fastening zone being offset from the duct aperture in the direction of flow of the fluid and being joined to the duct aperture by said wall portion.

2. A fluid flow control device according to claim 1, wherein said central region of the membrane is substantially flat in said first position.

3. A fluid flow control device according to claim 1, wherein the membrane is of corrugated form in its said second position.

4. A fluid control device for a climate control system in a motor vehicle comprising:
   a climate control duct having a duct wall defining a passage for flow of a climate control fluid through the duct;
   a seating in the duct defining a duct aperture for introduction of the climate control fluid into the duct;
   a flexible, deformable membrane member having a peripheral portion secured to the duct wall, a central portion selectively engageable with said duct seating, and an intermediate portion surrounding said central portion said connecting said central portion to said peripheral portion, said intermediate portion including at least one fluid flow aperture; and
   an actuating member fixedly attached to said central portion of said membrane and selectively operable to: (a) force said membrane central portion against said duct seating to close said duct and prevent the flow of climate control fluid therethrough in a first position of the membrane; (b) separate said membrane central portion away from said duct seating to permit a maximum flow of climate control fluid through said duct aperture in a second position of the membrane; and (c) separate said membrane central portion a desired distance from said duct seating to permit a desired, less than maximum flow of climate control fluid through said duct in a third position of the membrane, said fluid control device further comprising a sheath having a fixed end, said actuating member comprising a cable arranged to slide in the sheath and having a portion projecting beyond said fixed end of the sheath and being fixed to the central region of the membrane.

* * * * *

UNITED STATES PATENT AND TRADEMARK OFFICE
CERTIFICATE OF CORRECTION

PATENT NO. : 5,244,184
DATED : September 14, 1993
INVENTOR(S) : Patrick Larseneur It is certified that error appears in the above-indentified patent and that said Letters Patent is hereby corrected as shown below:

Column 4, Claim 4, line 13, "said" (second occurrence) should read --and--.

Signed and Sealed this

Tenth Day of May, 1994

Attest:

BRUCE LEHMAN

*Attesting Officer*     *Commissioner of Patents and Trademarks*